(12) United States Patent
Lin et al.

(10) Patent No.: US 7,778,657 B2
(45) Date of Patent: Aug. 17, 2010

(54) METHOD AND APPARATUS TO PERFORM POWER CONTROL IN A WIRELESS NETWORK

(75) Inventors: Xintian E. Lin, Mountain View, CA (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1048 days.

(21) Appl. No.: 11/391,054

(22) Filed: Mar. 28, 2006

(65) Prior Publication Data

US 2007/0238480 A1    Oct. 11, 2007

(51) Int. Cl.
*H04W 52/06* (2009.01)

(52) U.S. Cl. .................. 455/522; 455/69; 455/67.11

(58) Field of Classification Search ............... None
See application file for complete search history.

(56) References Cited

U.S. PATENT DOCUMENTS

| 5,845,208 A | * | 12/1998 | Hottinen et al. | ......... 455/522 X |
| 6,128,494 A | * | 10/2000 | Rozmaryn | ................. 455/436 |
| 7,433,310 B2 | * | 10/2008 | Marinier | .................... 370/232 |

* cited by examiner

*Primary Examiner*—Philip J Sobutka
(74) *Attorney, Agent, or Firm*—Thorpe North & Western LLP

(57) ABSTRACT

Techniques are provided that allow power control and/or hand off operations to be performed in a wireless network in a manner that can enhance overall network throughput. In at least one embodiment, signal to noise ratio (SNR) and a signal to interference ratio (SIR) are obtained for a first mobile device within a wireless network. The SNR and SIR are then used to perform power control in the network (e.g., for the first mobile device). The SNR and SIR may also be used to facilitate hand off operations. In one approach, it may be determined whether the SNR and the SIR are each high or low, based on comparison with predetermined threshold values, in order to make a power control decision.

26 Claims, 7 Drawing Sheets

METHOD AND APPARATUS TO PERFORM POWER CONTROL IN A WIRELESS NETWORK

TECHNICAL FIELD

The invention relates generally to wireless communication and, more particularly, to wireless networking.

BACKGROUND OF THE INVENTION

Wireless mobile devices within wireless networks receive signals from other wireless entities within the network through a wireless medium. After a signal is received by a mobile device, it must be processed to demodulate and decode the signal and to convert it into a usable form. If the signal is weak, or if it is corrupted by interference or noise, the signal will typically be more difficult to process and, in some cases, the underlying information may be lost. Power control is a technique that can be used to adjust the transmit power levels being used in a wireless network so that data loss in the network may be reduced. Channel quality feedback may be delivered from a mobile device to an associated base station that is indicative of the quality of one or more signals received from the base station. The base station may then adjust a transmit power level being used to transmit signals to the mobile device based on the feedback. When a mobile device approaches a cell boundary in a wireless network, a hand off operation is often performed to change the association of the mobile device to the BS of the new cell. There is a general need for techniques that enhance the effectiveness of power control and hand off operations within a wireless network.

DETAILED DESCRIPTION

Figure 1:
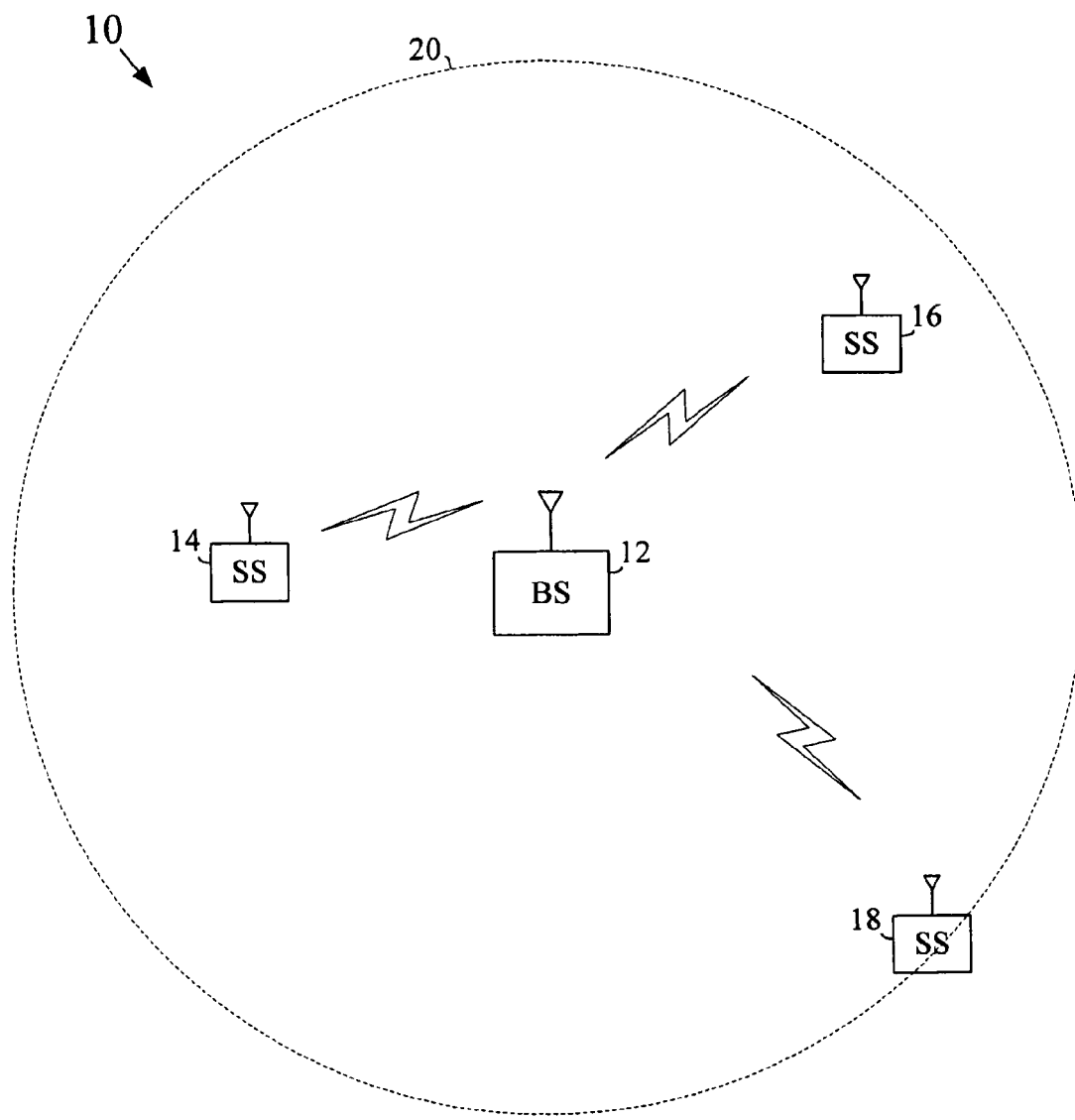
FIG. 1 is a diagram illustrating an example wireless network arrangement that may incorporate features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating an example wireless network arrangement 10 that may incorporate features of the present invention. As shown, the network arrangement 10 includes a base station (BS) 12 and a number of subscriber stations (SSs) 14, 16, 18. The BS 12 provides wireless access to a network for each of the SSs 14, 16, 18. The BS 12 provides access services primarily within a coverage region or cell 20. Other BSs (not shown) may provide network access services for areas outside of the cell 20. The network arrangement 10 may operate in accordance with any of a variety of different wireless networking or wireless cellular standards. In at least one embodiment, for example, the network arrangement 10 follows the IEEE 802.16 wireless networking standard.

During network operation, the BS 12 may transmit signals to the SSs 14, 16, 18 in a downlink direction and the SSs 14, 16, 18 may transmit signals to the BS 12 in an uplink direction. When the BS 12 transmits a wireless signal to a SS, the SS will typically demodulate and decode the signal and then use the decoded information in some intended manner. The accuracy of the demodulation and decoding process will typically depend upon the quality of the received signal being processed by the SS. Lower quality signals are usually harder to demodulate and decode and are therefore undesirable. A feedback mechanism will sometimes be provided in a network that allows an SS to inform a corresponding BS about the quality level of the signals being received. The delivery of feedback information may be in response to a request from the BS or it may be initiated by the SS itself. The BS 12 may be able to use this quality information to adjust a transmit power level associated with the SS. For example, if the feedback indicates that a low quality signal is being received by an SS, the BS 12 may decide to increase the power level of signals being transmitted to the SS. Similarly, if the feedback indicates that a high quality signal is being received by an SS, the BS 12 may decide to decrease the power level of signals being transmitted to the SS. In this manner, a desired level of communication quality may be maintained in the link from the BS to the SS.

In the past, signal to interference plus noise ratio (SINR) (or the related carrier to interference plus noise ratio (CINR)) has been the measure of channel quality that has been used most often as feedback in wireless networks. This measure gauges the quality of a receive signal using a ratio of the received signal strength of the desired signal to the sum of the interference and noise present in the receive circuitry of the receiving device. That is, this measure lumps all sources of undesired energy (e.g., both co-channel interference and noise) together and compares the result to the level of the desired receive signal. In conceiving the present invention, it was appreciated that a larger degree of decision making flexibility can be achieved in a network if different sources of undesired energy are treated separately. For example, some forms of undesired energy may effect multiple nodes in a network (e.g., co-channel interference) while other forms effect only a specific node (e.g., platform noise). By treating different categories of undesired energy separately in a feedback scheme, enhanced network operation and increased network throughput may be achieved. Thus, in at least one embodiment of the invention, instead of feeding back SINR to a BS, an SS may feed back signal to noise ratio (SNR) and signal to interference ratio (SIR) separately. As will be described in greater detail, this feedback scheme will give the base station extra information that may be used in generating better power control decisions. In addition, this extra information may also enable a base station to make better hand off decisions for the network.

As used herein, the word "interference" refers to undesired signal energy from a source external to a communication platform of interest (e.g., an SS, etc.) and the word "noise" refers to undesired signal energy from a source internal to the communication platform of interest. The primary source of interference within a wireless network is typically the transmissions of other communication devices in the network that are operative within the same frequency channel (i.e., co-channel interference). Other sources of interference may also be present within a network region including, for example, microwave ovens, burglar alarms, Bluetooth devices, and/or other signal generating components, devices, and systems.

One type of "noise" that is often present within a wireless network device is platform noise. Platform noise is noise that is generated within a platform by one or more signal generating components therein, typically clocks. Some sources of platform noise within a host device may include, for example, display clocks driving LCD displays, CK410 clocks, PCI clocks, PCI Express clocks, USB clocks, Azalea codec clocks, system management clocks, and/or others. As will be appreciated, platform noise is usually frequency dependent (i.e., it may be much more pronounced at some frequencies than others). In addition, it has been found that platform noise is often very time independent (i.e., it does not change much over time as long as clocks are not being turned on and off within the platform). Other sources of locally generated noise may also exist within a platform (e.g., thermal noise, etc.). It has been determined that platform noise is typically stronger and more detrimental to communication quality in a network than other types of noise.

Figure 2:
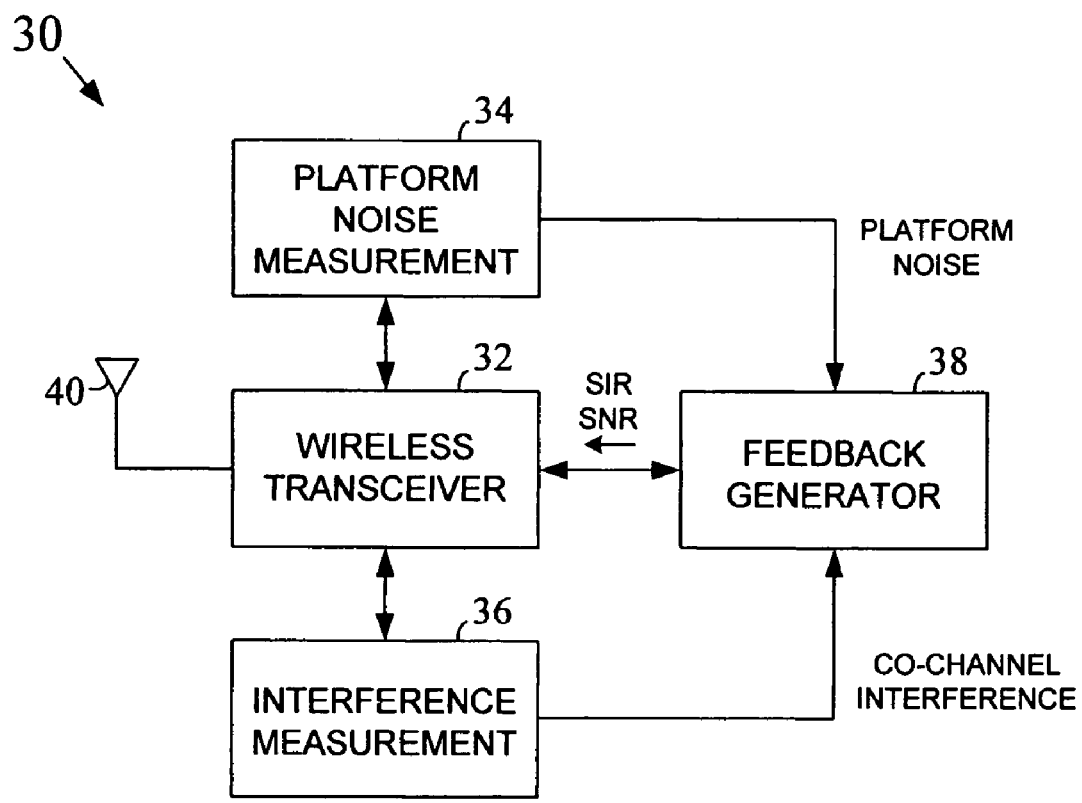
FIG. 2 is a block diagram illustrating functionality within an example subscriber station in accordance with an embodiment of the present invention.

FIG. 2 is a block diagram illustrating functionality within an example subscriber station (SS) 30 in accordance with an embodiment of the present invention. As shown, the SS 30 may include: a wireless transceiver 32, a platform noise measurement unit 34, an interference measurement unit 36, and a feedback generator 38. The wireless transceiver 32 is operative for supporting wireless communication with one or more remote communication entities in a corresponding network. As shown, the wireless transceiver 32 may be coupled to one or more antennas 40 to facilitate the reception and/or transmission of radio frequency (RF) signals from/to a wireless channel. Any type of antenna(s) may be used including, for example, a dipole, a patch, a helical antenna, an antenna array, and/or others. In networks supporting multiple input, multiple output (MIMO) operation, multiple antennas may be used with a different receive chain and a different transmit chain for each corresponding antenna.

The platform noise measurement unit 34 is operative for measuring the platform noise that is present within the SS 30. The platform noise may be measured during periods when no on-air communication activity is taking place in the channel of interest. In a network following IEEE 802.16, for example, these idle periods occur in the gaps between frames and in the gaps between uplink and downlink sub-frames. In networks that use orthogonal frequency division multiplexing (OFDM) and/or orthogonal frequency division multiple access (OFDMA), the platform noise may be measured as platform noise power per OFDM tone ($\sigma^2$/tone). In a MIMO based system, platform noise power per OFDM tone may be measured for each receive antenna that is active during communication activity. As described previously, it has been found that platform noise does not change significantly with time for an SS as long as the various noise generating components (e.g., local clocks, etc.) are not turned on and off during platform operation. Thus, platform noise measurements do not need to be performed during every communication transaction and platform noise updates may, in many cases, be made infrequently and stored for use during communication activity.

The interference measurement unit 36 measures the co-channel interference that is seen by the wireless transceiver 32 within a frequency channel of interest. The co-channel interference may include transmissions from one or more co-channel base stations or access points within range of the SS 30, transmissions from co-channel SSs within range of the SS 30, and/or transmissions from other sources that are within the frequency channel of interest. The co-channel interference may be estimated in the presence of the desired signal by subtracting the signal power of the desired signal and the noise power from the total received signal power. Alternatively, the co-channel interference may be estimated during a period when the desired signal is not present.

The feedback generator 38 is operative for generating a feedback signal for delivery to a remote wireless entity (e.g., a base station, another SS, etc.) that may include channel quality information. The feedback signal may be used by the remote entity to determine whether to adjust, for example, a transmit power level being used to transmit signals to the SS 30. As shown, the feedback generator 38 may receive platform noise information from the platform noise generator 34 and co-channel interference information from the interference measurement unit 36. The feedback generator 38 may also receive signal strength information from the wireless transceiver 32 relating to the signal strength of the desired signal received from the remote entity. The feedback generator 38 may use this information to generate the feedback signal. For example, the feedback generator 38 may insert both (1) signal to noise ratio (SNR) information (generated based on the platform noise information) and (2) signal to interference ratio (SIR) information (generated based on the co-channel interference information) in the signal that is fed back to the remote entity. In at least one embodiment, the feedback generator 38 may also insert an identifier (e.g., a MAC address, etc.) of the strongest interference source being detected by the SS 30.

The feedback signal may be generated in response to a request from the remote entity (e.g., a channel measurement report response message (REP-RSP) generated in an IEEE 802.16 based system in response to a channel measurement report request message (REP-REQ) received from a base station, etc.) or it may be generated in an unsolicited fashion by the SS 30 (e.g., an unsolicited REP-RSP generated in an IEEE 802.16 based system, etc.). When the remote entity receives the feedback signal, it may read the SNR information and the SIR information and use the information to make one or more decisions regarding the operational parameters of a corresponding wireless link. For example, the remote entity may decide whether or not to modify a transmit power level used to transmit signals to the SS 30, whether to allow a handover of the SS 30 from a current BS to a new BS, etc. Because the noise related information is separated from the interference related information, the remote entity has greater flexibility in achieving an optimal result for the network as a whole.

In the embodiment discussed above, both SIR information and SNR information are fed back from a SS in a network to a remote entity, such as a BS. The SNR may be expressed as:

$$SNR = \frac{\text{Signal Power of Desired Receive Signal}}{\text{Platform Noise Power}}$$

and the SIR may be expressed as:

$$SIR = \frac{\text{Signal Power of Desired Receive Signal}}{\text{Average Received Co-channel Interference Power}}.$$

It should be appreciated that many alternative formats may be used to communicate this information to the remote entity. For example, in a most obvious format, the feedback may include an SIR value and an SNR value. In another possible format, an SIR value and a ratio value may be transmitted back to the remote entity, where the ratio value is the ratio of the SNR value to the SIR value. In another format, interference power, noise power, and desired signal power may be fed back. Other formats also exist. The invention may use any format that is capable of conveying all of the information to the remote entity that is necessary to determine both SNR and SIR within the remote entity for use in decision making. In an OFDM or OFDMA system, separate feedback information may (or may not) be included for each subcarrier of the OFDM signal (or a subset of the subcarriers).

Figure 3:
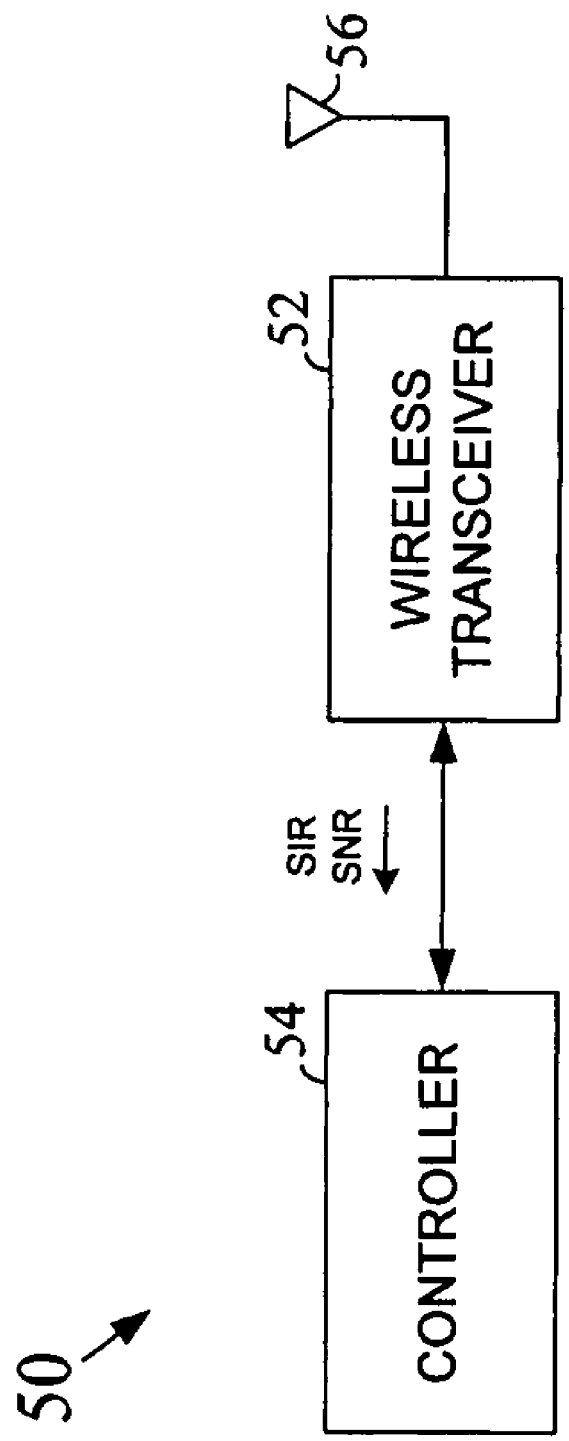
FIG. 3 is a block diagram illustrating functionality within an example base station in accordance with an embodiment of the present invention.

FIG. 3 is a block diagram illustrating functionality within a BS 50 in accordance with an embodiment of the present invention. As illustrated, the BS 50 may include a wireless transceiver 52 and a controller 54. The wireless transceiver 52 is capable of supporting wireless communication with multiple SSs within a corresponding coverage area. The wireless transceiver 52 may be coupled to one or more antennas 56 to, for example, facilitate the reception and/or transmission of radio frequency (RF) signals from/to corresponding wireless channels. Any type of antenna(s) may be used including, for example, a dipole, a patch, a helical antenna, an antenna array, and/or others. The controller 54 is capable of performing various communication related functions for the BS 50. The controller 54 may be implemented using one or more digital processing devices. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The controller 54 may also include one or more hardware implemented components.

When a feedback message including SIR and SNR information is received by the wireless transceiver 52 from an SS, the wireless transceiver 52 may deliver the message to the controller 54. The controller 54 includes logic that reads the SIR and SNR information and performs any processing necessary to retrieve SIR and SNR values therefrom. As described above, in at least one embodiment, the actual SIR and SNR values will be in the feedback and no further processing is necessary to calculate the values. The controller 54 may also include logic that uses the SIR and SNR feedback values to make one or more power control related decisions for the network. For example, the controller 54 may use the information to determine whether or not to modify the transmit power being used to transmit signals to the corresponding SS. If the controller decides to modify the transmit power, an appropriate control signal may be delivered to the wireless transceiver 52. The controller 54 may also include logic that uses the SIR, SNR feedback information to determine whether or not to hand off the SS to another BS. If the controller 54 decides that a hand off is warranted, it may proceed to coordinate the handoff with the SS and the new BS. As used herein, the term "logic" may include, by way of example, software or hardware and/or combinations of software and hardware.

Figure 4:
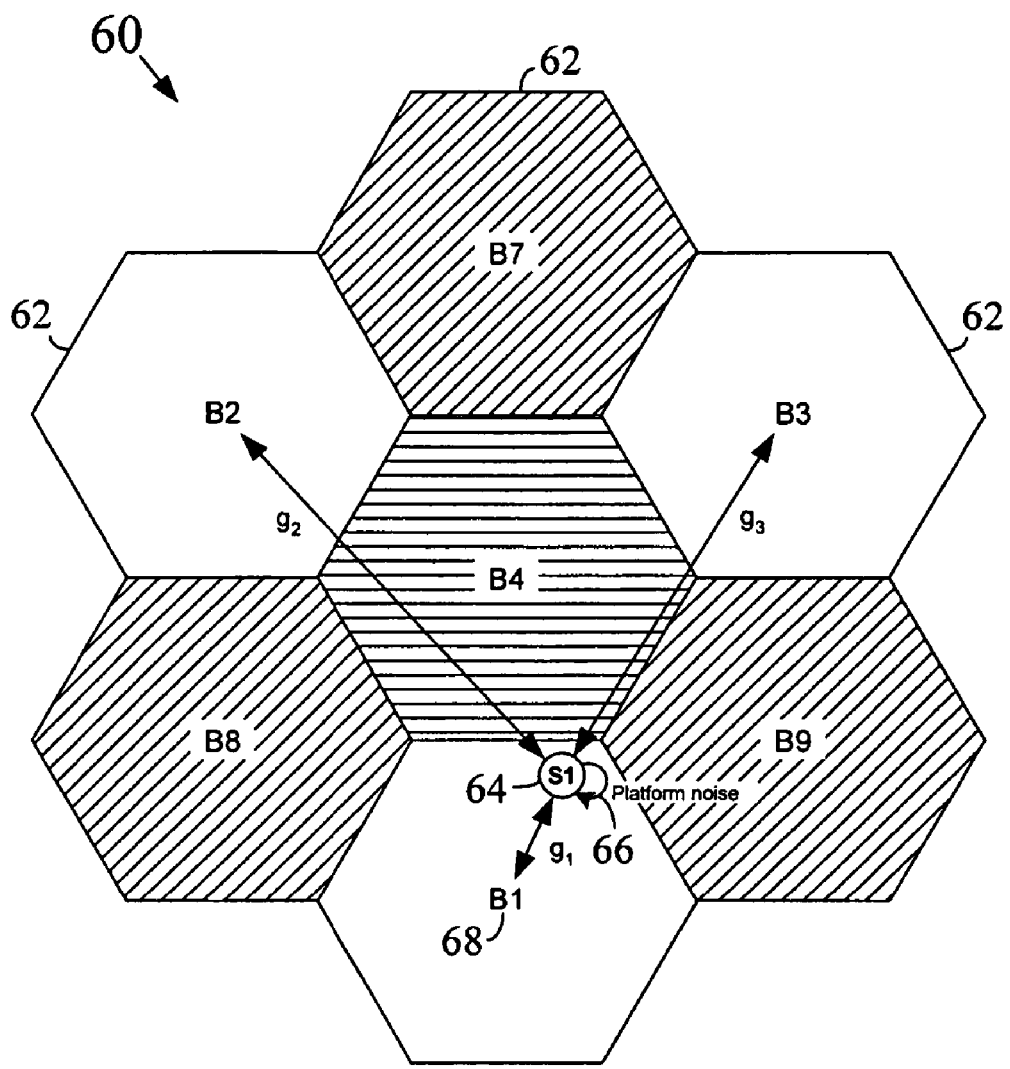
FIG. 4 is a diagram illustrating an example wireless network scenario in accordance with an embodiment of the present invention.

FIG. 4 is a diagram illustrating an example wireless network scenario 60 in accordance with an embodiment of the present invention. As shown, a number of base stations (B1, B2, B3, B4, B5, B6, B7, B8, and B9) are distributed within a network region. Each base station has a corresponding coverage region or cell 62. Co-channel cells are illustrated in FIG. 4 using a common shading scheme. For example, cells having a diagonal shading scheme utilize a first wireless channel, cells having a horizontal shading scheme utilize a second wireless channel, and cells having no shading utilize a third wireless channel. Other network configurations and frequency reuse patterns may alternatively be used. A first subscriber station 64 (S1) is located within a cell associated with a first base station 68 (B1). S1 generates internal platform noise 66 that can interfere with signal reception. S1 also receives co-channel interference from base stations B2 and B3. In past networks, S1 would transmit a feedback signal to B1 that includes the SINR of a signal or signals received at S1 from B1. When the SINR value was low, B1 would increase the transmit power used to transmit to S1. This would temporarily increase the SINR of S1, but it would also raise the co-channel interference of SSs in the co-channel cells of B2 and B3. These SSs would then send SINR values to their respective base stations (B2 and B3), which would then increase their transmit power levels. The signals transmitted by B2 and B3 would then increase the co-channel interference seen by S1. The end result would often be that S1 achieves little or no improvement in SINR.

In accordance with at least one embodiment of the present invention, S1 measures and feeds back SNR and SIR related information. By feeding back both SNR and SIR information, additional information is available to B1 regarding both the receiver sensitivity and the location of S1. Table 1 below illustrates the different feedback possibilities for a SS and the corresponding actions that may be taken by a BS in accordance with an embodiment of the invention. As shown, the decisions may be

TABLE 1

| FEEDBACK | ACTION |
|---|---|
| SIR = high, SNR = high | Decrease BS Transmit Power |
| SIR = high, SNR = low | Increase BS Transmit Power |
| SIR = low, SNR = high | Decrease Transmit Power of Other BSs |
| SIR = low, SNR = low | Hand Off to Other BS | made based upon whether the SIR and the SNR are low or high. The low or high status of an SIR or SNR value may be determined using threshold values. For example, if the SIR is above a first threshold value, it may be deemed high, and if it is below a second threshold value, it may be deemed low. Similarly, if the SNR is above a third threshold, it may be deemed high, and if it is below a fourth threshold, it may be deemed low. With reference to Table 1, if both the SIR and the SNR for a SS are high, then the BS may decrease its transmit power. As both parameters indicate that there is power to spare for the SS of interest, reducing the transmit power of the BS may also reduce the co-channel interference being experienced by other SSs. If the SNR is high and the SIR is low, then the BS may cause the transmit power levels of other co-channel BSs to be lowered (i.e., to improve SIR). The BS may also lower its own transmit power level.

If the SNR of the SS is low, then one of two scenarios will typically exist. That is, either (1) the SS is far from the BS, or (2) the platform noise of the SS is high (or both). To determine which one applies, the BS can simply measure the signal strength received from the SS. If the signal strength is high, then the SS is probably close to the BS and the platform noise of the SS is high. The high platform noise indicates that the sensitivity of the receiver in the SS is low and, therefore, the SS should be given a low scheduling priority with respect to other SSs having higher sensitivities. If the signal strength is low, then the SS is probably far from the BS. In this case, if the SIR is high, then the BS may increase its transmit power. That is, because the SIR is high, the SS will not be significantly affected if co-channel base stations in other cells increase their transmit power in response to the BS power increase.

If SIR is low, it may be assumed that the SS is toward the edge of the cell. At this location, hand off is a possibility and any increase in BS transmit power may increase co-channel interference in other cells. Thus, if SNR is also low, a hand off to an adjacent cell (using a different frequency channel) may be considered. This may require another procedure to be followed to determine whether hand off is an optimal solution. In at least one embodiment, hand off is automatically performed when both SIR and SNR are low. The above described functions may be performed within, for example, a base station in the network (e.g., within the controller 54 of BS 50 in FIG. 3).

In the wireless network scenario 60 of FIG. 4, it was assumed that a communication technique such as OFDMA, time division multiple access (TDMA), or code division multiple access (CDMA) was being used. These communication techniques are used, for example, within networks following the IEEE 802.16 standard, second generation (2G) cellular standard, and third generation (3G) cellular standard, respectively. In these type of networks, co-channel interference levels are controlled primary through the use of power control and scheduling. In such networks, the co-channel interference affecting a SS will typically be from BSs in other cells and not from other SSs. In other networks, carrier sense multiple access with collision avoidance (CSMA/CA) is used as a channel access protocol (e.g., networks following IEEE 802.11, etc.). In these networks, co-channel interference may be generated by both SSs and BSs in other cells due to errors in the clear channel assessment (CCA) function and the hidden node problem. The CCA error can be caused by, for example, low power transmission such as is present when implementing IEEE 802.11h power control. In the examples that follow, it is assumed that CSMA/CA is being used as a channel access protocol. The invention has application in networks using all of the above described techniques as well as others (i.e., OFDM, OFDMA, TDMA, CDMA, and CSMA/CD).

In the past, base station hand off decisions were made, like power control decisions, using SINR. That is, the BS that generates the highest SINR within a SS would be chosen as the associated BS. Using this approach, the closest BS would usually become the associated BS of an SS and the resulting interference effects on other SSs in the network would not be considered. In at least one embodiment of the present invention, SNR and SIR values are used during hand off decisions instead of SINR. By using SNR and SIR values, co-channel interference within other SSs in the network can be considered as part of the hand off decision making process. In this manner, a more optimal hand off decision may be made with a view toward the network as a whole, rather than optimizing the result for the SS of interest.

Figure 5:
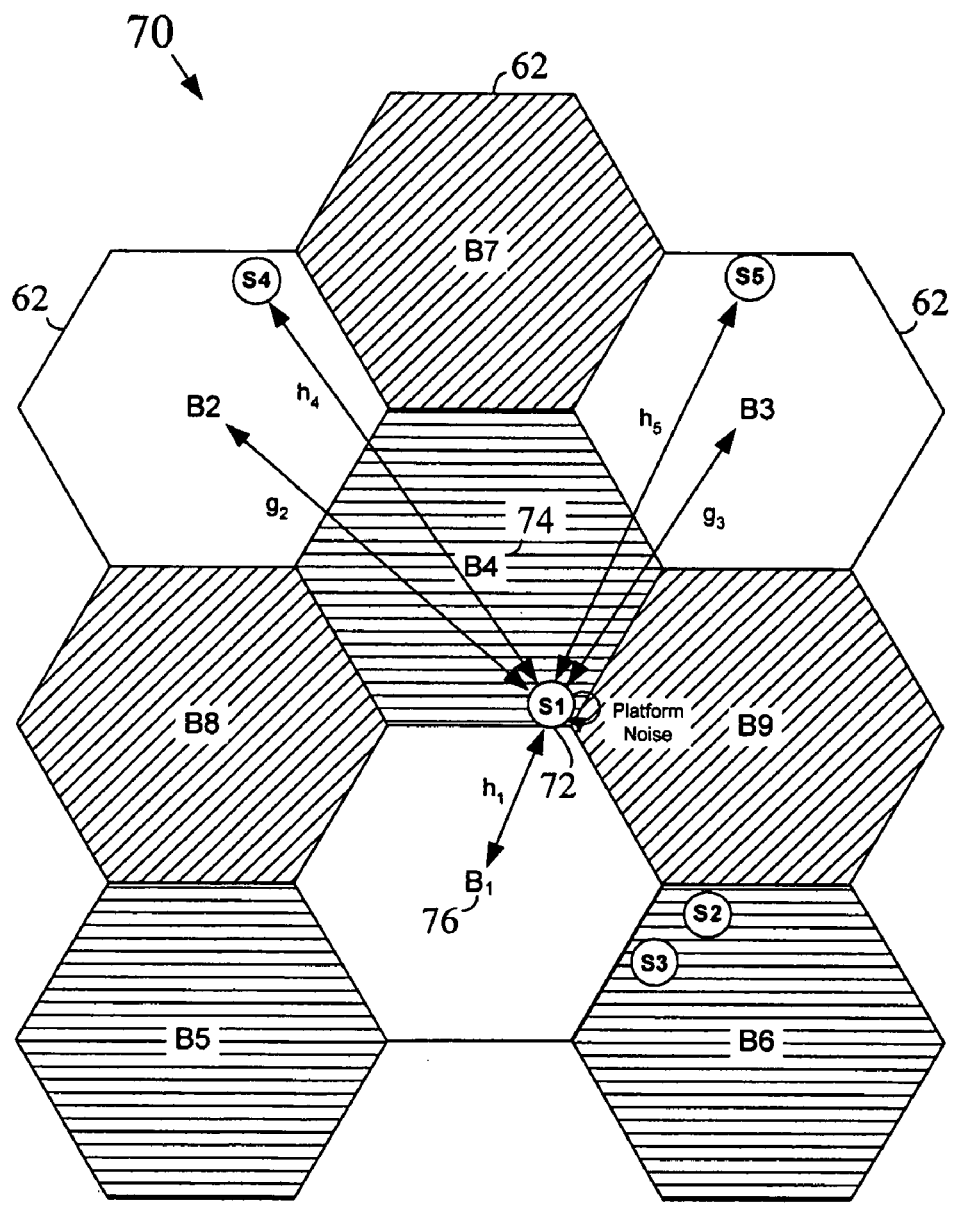
FIG. 5 is a diagram illustrating another example wireless network scenario in accordance with an embodiment of the present invention.

FIG. 5 is a diagram illustrating an example network scenario 70 in accordance with an embodiment of the present invention. As shown, a subscriber station 72 (S1) is currently located within a cell associated with a base station 74 (B4). S1 has just moved into the cell of B4 from the cell of B1 (base station 76) and is still associated with B1. It must now be determined whether S1 should be handed off to B4. As shown in FIG. 5, base station B2 and base station B3 are co-channel BSs with B1. In the illustrated example, each of the co-channel base stations has a single SS within a corresponding cell (i.e., B2 has S4 and B3 has S5). Because S4 and S5 are relatively far from S1, they will most likely generate only a small amount of interference to S1. Likewise, S1 may generate only a small amount of interference to S4 and S5.

Figure 6:
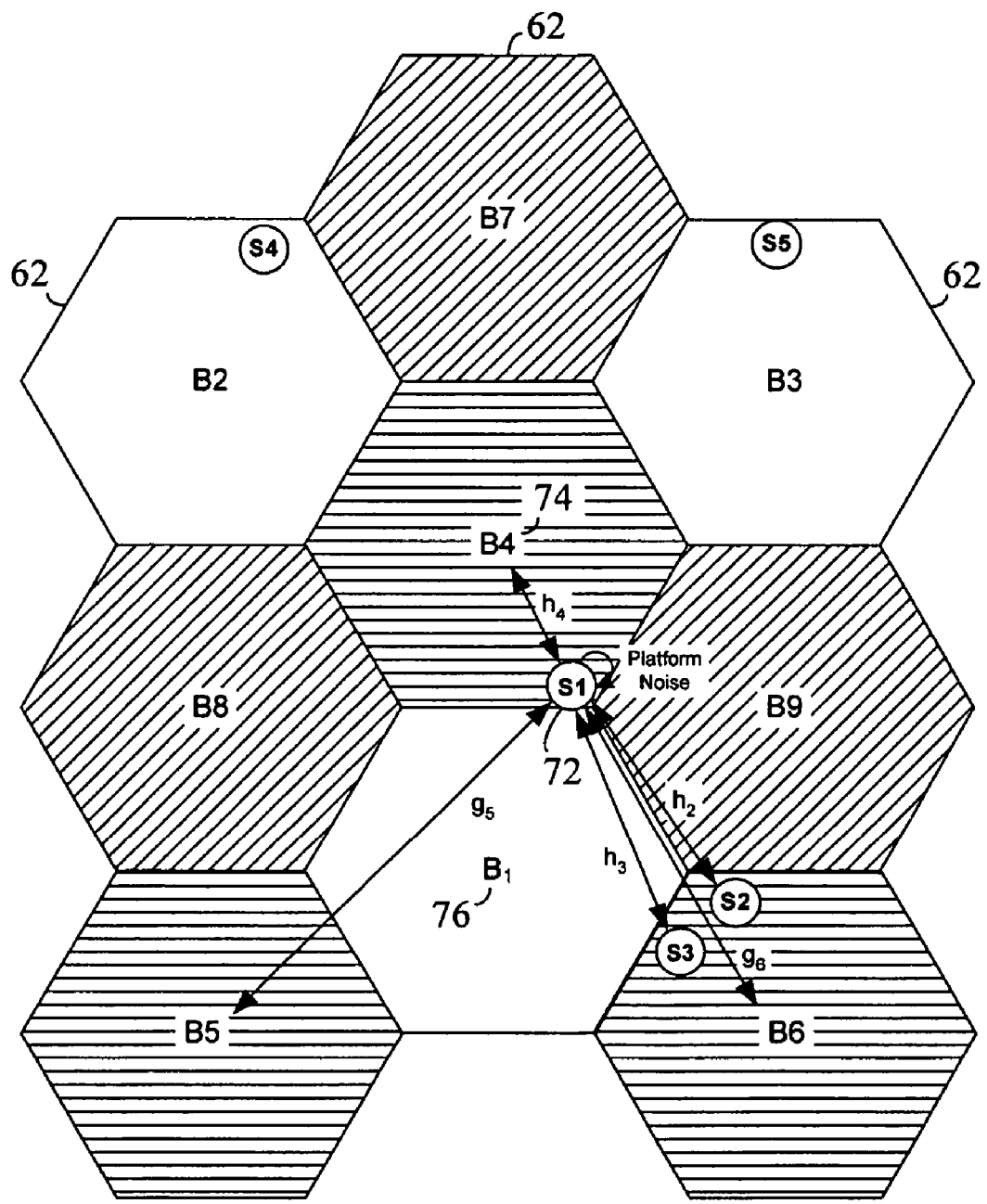
FIG. 6 is a diagram illustrating still another example wireless network scenario in accordance with an embodiment of the present invention.

FIG. 6 is a diagram illustrating an example network scenario 80 in accordance with an embodiment of the present invention that shows what would happen if S1 was handed off to B4, which is operative in a different frequency channel. As shown, B4 has base stations B5 and B6 as co-channel BSs. The cell of B6 includes subscriber stations S2 and S3. As shown, S2 and S3 are significantly closer to S1 than subscriber stations S4 and S5. Thus, these BSs will most likely be a greater source of co-channel interference than S4 and S5. Therefore, even though the SINR value associated with B4 is greater than the SINR value associated with B3 for S1, from an overall network throughput standpoint, B1 is a better choice for S1 because of the much lower co-channel interference. In at least one embodiment of the present invention, SIR and SNR values are measured by a SS for each candidate BS and are used to make a more optimal hand off decision for the network.

Figure 7:
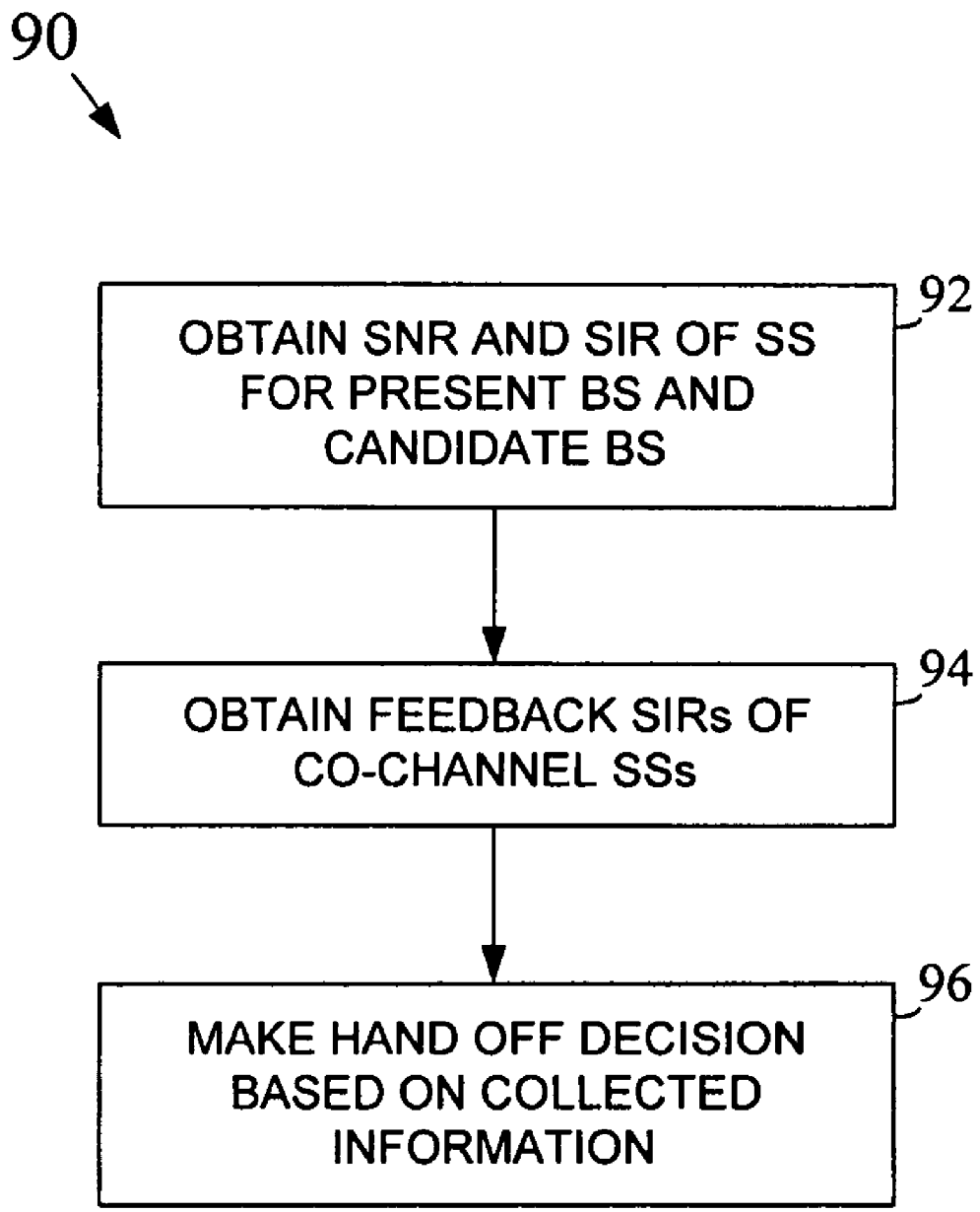
FIG. 7 is a flowchart illustrating a method for making a hand off decision for a subscriber station in a network in accordance with an embodiment of the present invention.

FIG. 7 is a flowchart illustrating a method 90 for making a hand off decision for an SS of interest in accordance with an embodiment of the present invention. First, an SNR and an SIR of an SS of interest are obtained for each BS being considered for hand off (block 92). Next, feedback SIRs of co-channel SSs of the SS of interest are obtained (block 94). Then, the SNR and SIR information of the SS of interest and the SIRs of the co-channel SSs are used to make the hand off decision. The above described actions may be performed within the present BS, the hand off candidate BS, or in the SS of interest. For example, with reference to FIG. 5, S1 may report SIR and SNR values to B1 for both B1's frequency band and B4's frequency band. S1 may then send a request to B1 for hand off from B1 to B4. B1 may then obtain the SIR's of S4 and S5. B1 may obtain these values through a wired network connecting the BSs or by reading the feedback transmissions of S4 and S5. If the SIRs of S4 and S5 are sufficiently high, B1 may decide to reject the hand off request of S1 and simply increase the transmit power to S1.

In a similar approach, B4 may obtain the SIR feedback information of S1, S4, and S5. B4 may then determine that the co-channel interference seen by S1 in the B1 frequency channel is much less than the co-channel interference that would be seen by S1 in the B4 frequency channel. B4 may then decide to reject the hand off request. In yet another approach, S1 may measure SIR and SNR values for both B1 and B4. S1 may then itself decide that the interference level seen in the B4 frequency range would be much higher than the interference level seen in the B1 frequency range. S1 may then refrain from issuing a hand off request to B1. In this approach, no feedback is required.

Table 2 below illustrates an example hand off decision process that uses SIR and SNR in accordance with an embodiment of the present invention. This decision process may be performed partially within the SS of interest and partially within a corresponding BS. The SS of interest first determines that a hand off from a first BS to a second BS may be warranted. The SS of interest then generates SINR, SNR, and SIR values for each of the candidate BSs. It may then be determined whether the SINR of the presently associated BS ($SINR_1$) is greater than or less than the SINR of the hand off candidate BS ($SINR_2$). It will also be determined whether the SNR of the presently associated BS ($SNR_1$) is greater than or less than the SNR of the hand off candidate BS ($SNR_2$) and whether the SIR of the presently associated BS ($SIR_1$) is greater than or less than the SIR of the hand off candidate BS ($SIR_2$). If $SINR_1$ is greater than $SINR_2$ and

TABLE 2

| | Measurement | MS action |
|---|---|---|
| $SINR_1 > SINR_2$ | $SNR_1 > SNR_2, SIR_1 > SIR_2$ | Do not hand over |
| | $SNR_1 < SNR_2, SIR_1 > SIR_2$ | Do not hand over |
| | $SNR_1 > SNR_2, SIR_1 < SIR_2$ | Report to BS |
| $SINR_1 < SINR_2$ | $SNR_1 < SNR_2, SIR_1 < SIR_2$ | Hand over |
| | $SNR_1 > SNR_2, SIR_1 < SIR_2$ | Hand over |
| | $SNR_1 < SNR_2, SIR_1 > SIR_2$ | Report to BS |

$SIR_1$ is greater than $SIR_2$, then the SS of interest will not request a hand off operation, regardless of the corresponding SNR values. Similarly, if $SINR_2$ is greater than $SINR_1$ and $SIR_2$ is greater than $SIR_1$, then the SS of interest will request a hand off operation, regardless of the SNR values. If $SINR_1$ is greater than $SINR_2$ and $SNR_1$ is greater than $SNR_2$, but $SIR_1$ is less than $SIR_2$, then the SS of interest will report the appropriate information to the presently associated BS (or the hand off candidate BS) and allow the BS to make the hand off decision. The BS may then collect additional information (e.g., SIR values from co-channel SSs in the network) in order to make an optimal hand off decision. Similarly, if $SINR_1$ is less than $SINR_2$ and $SNR_1$ is less than $SNR_2$, but $SIR_1$ is greater than $SIR_2$, then the SS of interest will also report the appropriate information to the presently associated BS (or the hand off candidate BS) and allow the BS to make the hand off decision. Like before, the BS may then collect additional information (e.g., SIR values from co-channel SSs in the network) in order to make an optimal hand off decision. In an alternative approach, the measured values may all be fed back to the BS (either current or hand off candidate) initially and the BS may make all of the above-described decisions.

As described previously, in at least one embodiment of the invention, a SS of interest may feed back the ID (e.g., MAC address, etc.) of a strongest interference source in addition to the SIR and SNR information. This ID information may then be used to further optimize power control within the network. For example, if many SSs in the network identify a particular node (SS or BS) as the strongest interference source, that node can be ordered to reduce its transmit power. Alternatively, if the node is a BS, it may be ordered to hand off some of its subscribers to other BSs.

In the description above, the inventive techniques are described in the context of an infrastructure type network configuration. It should be appreciated, however, that some of the inventive features may also be used within networks operating in an ad-hoc or peer to peer mode of operation. Terminology has been used in the description above that is often identified with the IEEE 802.16 and 802.11 wireless networking standard. It should be appreciated, however, that the inventive concepts have application in networks following a wide range of different wireless standards and are not limited to use within IEEE 802.16 networks.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

It should be appreciated that the individual blocks illustrated in the block diagrams herein may be functional in nature and do not necessarily correspond to discrete hardware elements. For example, in at least one embodiment, two or more of the blocks in a diagram may be implemented in software within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
obtaining a signal to noise ratio (SNR) and a signal to interference ratio (SIR) of a first mobile device within a wireless network; and
using said SNR and said SIR to perform power control within the wireless network;
wherein using said SNR and said SIR includes:
comparing said SNR to a first threshold to determine whether said SNR is high;

comparing said SNR to a second threshold to determine whether said SNR is low;
comparing said SIR to a third threshold to determine whether said SIR is high; and
comparing said SIR to a fourth threshold to determine whether said SIR is low.

2. The method of claim 1, wherein:
obtaining said SNR and said SIR includes receiving said SNR and said SIR as feedback from said first mobile device.

3. The method of claim 1, wherein:
obtaining said SNR and said SIR includes receiving feedback information from said first mobile device and using said feedback information to calculate said SNR and said SIR.

4. The method of claim 1, wherein using said SNR and said SIR includes:
reducing a transmit power being used to transmit signals to said first mobile device when said SIR and said SNR are both high.

5. The method of claim 1, wherein using said SNR and said SIR includes:
increasing a transmit power being used to transmit signals to said first mobile device when said SIR is high and said SNR is low.

6. The method of claim 1, wherein using said SNR and said SIR includes:
causing transmit power levels of other co-channel base stations in the wireless network to be reduced when said SIR is low and said SNR is high.

7. The method of claim 1, wherein using said SNR and said SIR includes:
considering a hand off of said first mobile device to another base station when said SIR is low and said SNR is low.

8. The method of claim 1, wherein:
said SNR and said SIR are associated with a current base station of said first mobile device; and
said method further comprises:
obtaining a SNR and a SIR of the first mobile device that are associated with a candidate handoff base station; and
making a hand off decision for said first mobile device using said SNR and said SIR associated with said current base station and said SNR and said SIR associated with said candidate hand off base station.

9. The method of claim 8, further comprising:
obtaining SIRs of other co-channel mobile devices within said wireless network, wherein making said hand off decision includes making said hand off decision using said SIRs of said other co-channel mobile devices.

10. An apparatus comprising:
a wireless transceiver to support wireless communication with at least one remote wireless entity in a wireless network; and
a controller to:
receive feedback from a first mobile device, via said wireless transceiver, from which both a signal to noise ratio (SNR) and a signal to interference ratio (SIR) associated with a wireless receiver of said first mobile device can be determined; and
use said feedback to perform power control in said wireless network;
wherein said controller includes:
logic to compare said SNR to a first threshold to determine whether said SNR is high;
logic to compare said SNR to a second threshold to determine whether said SNR is low;
logic to compare said SIR to a third threshold to determine whether said SIR is high; and
logic to compare said SIR to a fourth threshold to determine whether said SIR is low.

11. The apparatus of claim 10, wherein:
said feedback includes said SNR and said SIR.

12. The apparatus of claim 10, wherein said controller includes:
logic to reduce a transmit power being used to transmit signals to said first mobile device when said SIR and said SNR are both high.

13. The apparatus of claim 10, wherein said controller includes:
logic to increase a transmit power being used to transmit signals to said first mobile device when said SIR is high and said SNR is low.

14. The apparatus of claim 10, wherein said controller includes:
logic to instruct other co-channel base stations to reduce corresponding transmit power levels when said SIR is low and said SNR is high.

15. The apparatus of claim 10, wherein said controller includes:
logic to consider handing off said first mobile device to another base station when said SIR is low and said SNR is low.

16. The apparatus of claim 10, further comprising:
a dipole antenna, coupled to said wireless transceiver, to provide a transition between said wireless transceiver and a wireless medium.

17. An article comprising a non-transitory computer readable storage medium having instructions stored thereon that, when executed by a computing platform, operate to:
obtain a signal to noise ratio (SNR) and a signal to interference ratio (SIR) of a first mobile device within a wireless network; and
perform power control within the wireless network using said SNR and said SIR;
wherein operation to perform power control includes operation to:
compare said SNR to a first threshold to determine whether said SNR is high;
compare said SNR to a second threshold to determine whether said SNR is low;
compare said SIR to a third threshold to determine whether said SIR is high; and
compare said SIR to a fourth threshold to determine whether said SIR is low.

18. The article of claim 17, wherein operation to perform power control includes operation to:
reduce a transmit power being used to transmit signals to said first mobile device when said SIR and said SNR are both high.

19. The article of claim 17, wherein operation to perform power control includes operation to:
increase a transmit power being used to transmit signals to said first mobile device when said SIR is high and said SNR is low.

20. The article of claim 17, wherein operation to perform power control includes operation to:
cause transmit power levels of other co-channel base stations to be reduced when said SIR is low and said SNR is high.

21. An apparatus comprising:
a wireless transceiver to support wireless communication with at least one remote wireless entity;

a platform noise measurement unit to measure a noise power within a frequency range of interest that is generated by sources within said apparatus;

an interference measurement unit to measure an interference power within said frequency range of interest resulting from sources outside said apparatus; and a feedback generator to generate feedback for delivery to a remote wireless entity, said feedback including information from which both a signal to interference ratio (SIR) and a signal to noise ratio (SNR) within a receiver of said wireless transceiver can be determined, wherein SIR is a ratio of the signal power of a desired receive signal to the measured interference power and SNR is a ratio of the signal power of a desired receive signal to the measured noise power, wherein said SNR and said SIR are for use by said remote wireless entity to perform power control for said apparatus;

wherein, to perform power control for said apparatus, said remote wireless entity compares said SNR to a first threshold to determine whether said SNR is high, compares said SNR to a second threshold to determine whether said SNR is low, compares said SIR to a third threshold to determine whether said SIR is high; compares said SIR to a fourth threshold to determine whether said SIR is low, and makes a power control decision based on whether each of said SNR and said SIR are high or low.

22. The apparatus of claim 21, wherein:
said feedback includes said SIR and said SNR.

23. The apparatus of claim 21, wherein:
said feedback includes a measured platform noise power, a measured interference power, and a signal power of a desired receive signal.

24. An article comprising a non-transitory computer readable storage medium having instructions stored thereon that, when executed by a computing platform, operate to:

determine a platform noise level associated with a receiver of a wireless device;

measure an interference level of said receiver;

measure a signal level of a desired receive signal within said receiver; and generate feedback for delivery to a remote wireless entity, using said platform noise level, said interference level, and said signal level, said feedback including information from which both a signal to interference ratio (SIR) and a signal to noise ratio (SNR) of said receiver can be determined, wherein said SNR and said SIR are for use to perform power control for said wireless device;

wherein, to perform power control for said wireless device, said remote wireless entity compares said SNR to a first threshold to determine whether said SNR is high, compares said SNR to a second threshold to determine whether said SNR is low, compares said SIR to a third threshold to determine whether said SIR is high; compares said SIR to a fourth threshold to determine whether said SIR is low, and makes a power control decision based on whether each of said SNR and said SIR are high or low.

25. The article of claim 24, wherein:
said feedback includes said SIR and said SNR.

26. The article of claim 24, wherein:
said feedback includes said platform noise level, said interference level, and said signal level.

* * * * *